United States Patent
Oh et al.

(10) Patent No.: US 9,997,296 B2
(45) Date of Patent: Jun. 12, 2018

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Sung Kwon Oh, Suwon-Si (KR); Jae Wook Lee, Suwon-Si (KR); Min Sung Choi, Suwon-Si (KR); Jae Yeol Choi, Suwon-Si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 29 days.

(21) Appl. No.: 14/942,692

(22) Filed: Nov. 16, 2015

(65) Prior Publication Data
US 2016/0233029 A1  Aug. 11, 2016

(30) Foreign Application Priority Data

Feb. 6, 2015 (KR) .................. 10-2015-0018572

(51) Int. Cl.
*H01G 4/30* (2006.01)
*H01G 4/228* (2006.01)
(Continued)

(52) U.S. Cl.
CPC .............. *H01G 4/30* (2013.01); *H01G 4/012* (2013.01); *H01G 4/232* (2013.01); *H01G 4/12* (2013.01)

(58) Field of Classification Search
CPC ............ H01G 4/30; H01G 4/12; H01G 4/012; H01G 4/1227; H01G 4/232
(Continued)

(56) References Cited

U.S. PATENT DOCUMENTS

2004/0090732 A1* 5/2004 Ritter .................. C23C 18/1605
 361/306.1
2007/0006959 A1* 1/2007 Greier ..................... H01G 2/12
 156/89.12

(Continued)

FOREIGN PATENT DOCUMENTS

JP  2529159 Y2  3/1997
KR  10-2009-0032671 A  4/2009
(Continued)

OTHER PUBLICATIONS

Korean Office Action dated Mar. 4, 2016, issud in corresponding Korean patent application No. 10-2015-0018572. (w/ English translation).

*Primary Examiner* — David M Sinclair
*Assistant Examiner* — Arun Ramaswamy
(74) *Attorney, Agent, or Firm* — McDermott Will & Emery LLP

(57) ABSTRACT

A multilayer ceramic electronic component includes a ceramic body having a stacked plurality of dielectric layers and first and second end portions and a plurality of lateral surfaces. A plurality of internal electrodes stacked in the ceramic body face each other with respective dielectric layers interposed therebetween and exposed to first and second lateral surfaces of the ceramic body opposing each other through respective lead portions thereof. At least two first external electrodes and at least two second external electrodes are provided on the first and second lateral surfaces to be connected to the respective lead portions, respectively. An insulation layer is provided on the first and second lateral surfaces of the ceramic body except for the first and second external electrodes.

14 Claims, 4 Drawing Sheets

(51) Int. Cl.
*H01G 4/06* (2006.01)
*H01G 4/005* (2006.01)
*H01G 4/012* (2006.01)
*H01G 4/232* (2006.01)
*H01G 4/12* (2006.01)

(58) Field of Classification Search
USPC .................. 361/301.4, 321.1, 306.1, 303
See application file for complete search history.

(56) References Cited

U.S. PATENT DOCUMENTS

| | | | |
|---|---|---|---|
| 2009/0086405 A1 | 4/2009 | Lee et al. | |
| 2009/0323253 A1 | 12/2009 | Kobayashi et al. | |
| 2010/0206624 A1* | 8/2010 | Feichtinger | H01G 4/228 174/260 |
| 2011/0122540 A1 | 5/2011 | Ogawa et al. | |
| 2013/0050897 A1 | 2/2013 | Kim | |
| 2013/0250474 A1* | 9/2013 | Takeuchi | H01G 4/01 361/301.4 |
| 2014/0124251 A1 | 5/2014 | Park et al. | |
| 2015/0325369 A1* | 11/2015 | Inoue | H01C 17/02 336/200 |

FOREIGN PATENT DOCUMENTS

| | | | |
|---|---|---|---|
| KR | 10-2013-0024531 A | 3/2013 | |
| KR | 10-2014-0058903 A | 5/2014 | |
| WO | WO 2014119564 A1 * | 8/2014 | ............ H01C 17/02 |

* cited by examiner

MULTILAYER CERAMIC ELECTRONIC COMPONENT AND METHOD OF MANUFACTURING THE SAME

CROSS-REFERENCE TO RELATED APPLICATION

This application claims the priority and benefit of Korean Patent Application No. 10-2015-0018572 filed on Feb. 6, 2015, with the Korean Intellectual Property Office, the disclosure of which is incorporated herein by reference.

BACKGROUND

The present disclosure relates to a multilayer ceramic electronic component and a method of manufacturing the same, and more particularly, to a multilayer ceramic electronic component capable of preventing reliability from being deteriorated, and a method of manufacturing the same.

As miniaturization and thinness of information technology (IT) devices such as various communications devices, display devices, or the like, have accelerated, research into a technology for miniaturization and thinning of a high capacity of various elements such as transformers, inductors, capacitors, transistors, and the like, used in these IT devices has been continuously conducted.

Particularly, a multilayer ceramic capacitor (MLCC) having advantages such as compactness, reduced thickness, and high capacitance has been required. In the development of a high capacitance multilayer ceramic capacitor, it is important to secure high reliability depending on voltage application in addition to implementation of capacitance.

Generally, reliability of the multilayer ceramic capacitor is determined by results obtained by evaluating hot insulation resistance characteristics and humid insulation resistance characteristics.

The hot insulation resistance characteristics mainly depend on physical aspects (for example, a dielectric material configuring the capacitor, degradation characteristics of internal electrodes, a fine structure defect, and/or the like thereof) of materials used.

Meanwhile, humid insulation resistance characteristics depend on structural aspects (for example, pores generated during compression or cutting, delamination between layers, uncoated regions of internal electrodes generated after performing sintering, structural defects easily occurring between the layers, such as cracks, or the like, and/or pores in external electrodes).

SUMMARY

An exemplary embodiment in the present disclosure provides a multilayer ceramic electronic component capable of preventing reliability from being deteriorated due to the plating spread while external electrodes are formed by a plating process.

An exemplary embodiment in the present disclosure also provides a method of manufacturing a multilayer ceramic electronic component capable of preventing reliability from being deteriorated due to plating spread while external electrodes are formed by a plating process.

According to an exemplary embodiment in the present disclosure, a multilayer ceramic electronic component includes a ceramic body formed by stacking a plurality of dielectric layers and having first and second end portions opposing each other and a plurality of lateral surfaces connecting the first and second end portions to each other, a plurality of internal electrodes stacked in the ceramic body to face each other with respective dielectric layers interposed between the plurality of internal electrodes and exposed to first and second lateral surfaces of the ceramic body opposing each other among the plurality of lateral surfaces of the ceramic body through respective lead portions of the plurality of internal electrodes, at least two first external electrodes and at least two second external electrodes provided on the first and second lateral surfaces of the ceramic body to be connected to the respective lead portions of the plurality of the internal electrodes, respectively, and an insulation layer provided on the first and second lateral surfaces of the ceramic body except for the first and second external electrodes.

The dielectric layers may contain a ceramic material.

The plurality of internal electrodes may contain nickel. Each of the plurality of internal electrodes may have two lead portions.

Each of the first and second external electrodes may include a conductive paste hardened layer connected to the lead portions, and a plating layer on the conductive paste hardened layer. The conductive paste hardened layer may contain silver. The plating layer may contain nickel or tin. The insulation layer may further cover a portion of the conductive paste hardened layer.

The insulation layer may not cover any portion of the plating layer.

The insulation layer may cover 99% or more of each of the first and second lateral surfaces of the ceramic body except for the first and second external electrodes.

The insulation layer may contain an epoxy or a filler-containing epoxy.

According to another aspect of the present disclosure, a method of manufacturing a multilayer ceramic electronic component may include preparing a ceramic body formed by stacking a plurality of dielectric layers, having first and second end portions opposing each other and a plurality of lateral surfaces connecting the first and second end portions to each other, and including a plurality of internal electrodes stacked in the ceramic body to face each other with respective dielectric layers interposed between the plurality of internal electrodes and exposed to first and second lateral surfaces of the ceramic body opposing each other among the plurality of lateral surfaces of the ceramic body through respective lead portions of the plurality of internal electrodes, forming an insulation layer on the first and second lateral surfaces, the insulation layer not covering the respective lead portions of the plurality of internal electrodes exposed to the first and second lateral surfaces of the ceramic body, and forming at least two first external electrodes and at least two second external electrodes on the first and second lateral surfaces of the ceramic body to be connected to the respective lead portions of the plurality of internal electrodes.

The dielectric layers may contain a ceramic material.

The plurality of internal electrodes may contain nickel. Each of the plurality of internal electrodes may have two lead portions.

The forming of the insulation layer and the forming of the first and second external electrodes may include forming two or more conductive paste hardened layers on each of the first and second lateral surfaces of the ceramic body to be connected to the respective lead portions of the plurality of internal electrodes, forming the insulation layer on the first and second lateral surfaces of the ceramic body on which the conductive paste hardened layers are not formed, and forming a plating layer on the respective conductive paste hardened layers.

In the forming of the conductive paste hardened layers, a silver paste may be applied and then hardened.

In the forming of the plating layer, nickel or tin plating may be performed on the conductive paste hardened layer.

The insulation layer may be formed to further cover portions of the conductive paste hardened layers.

The insulation layer may be formed to cover 99% or more of each of the first and second lateral surfaces of the ceramic body except for the first and second external electrodes.

The insulation layer may be formed of an epoxy or a filler-containing epoxy.

The insulation layer may be formed prior to the plating layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
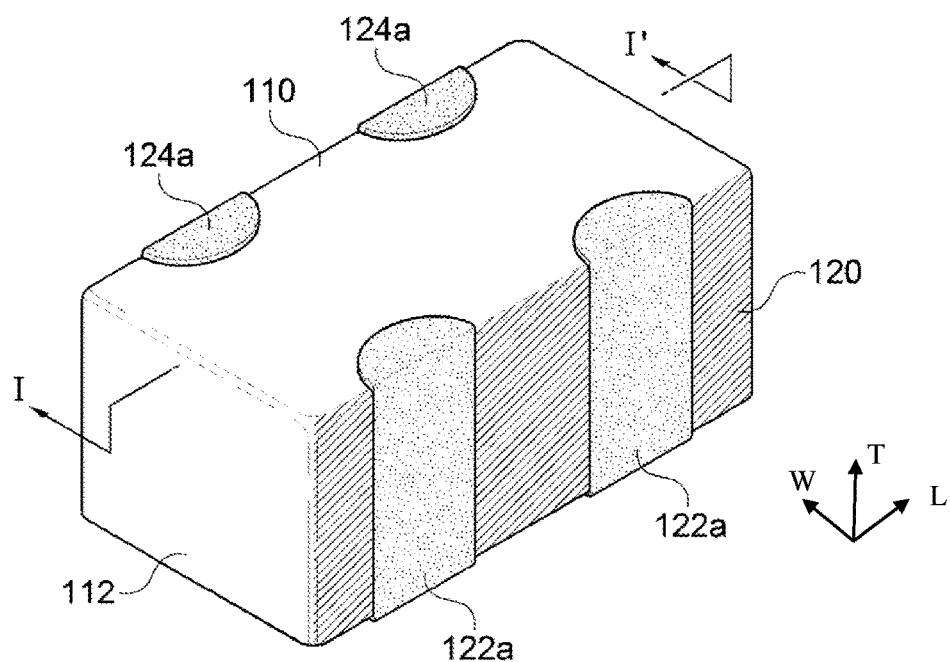
FIG. 1 is a stereoscopic view schematically illustrating a multilayer ceramic electronic component according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
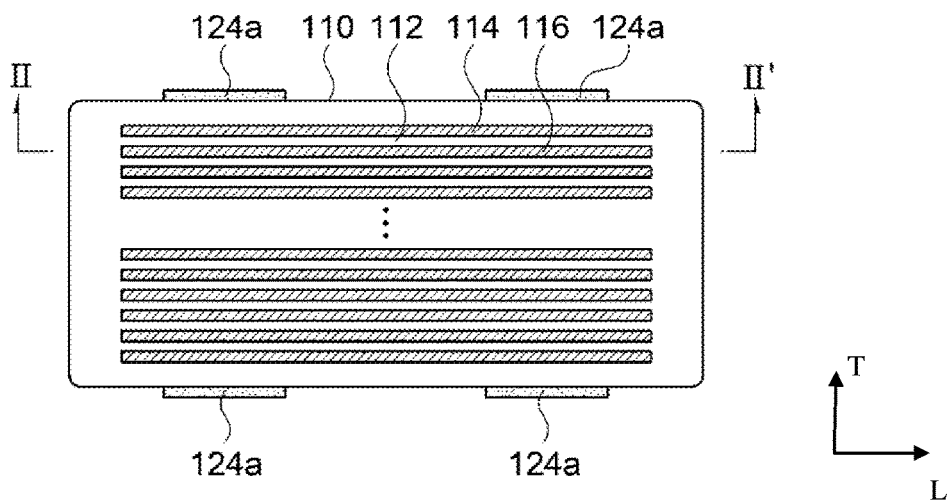
FIG. 2 is a cross-sectional view taken along line I-I' of FIG. 1.
Figure 3A:
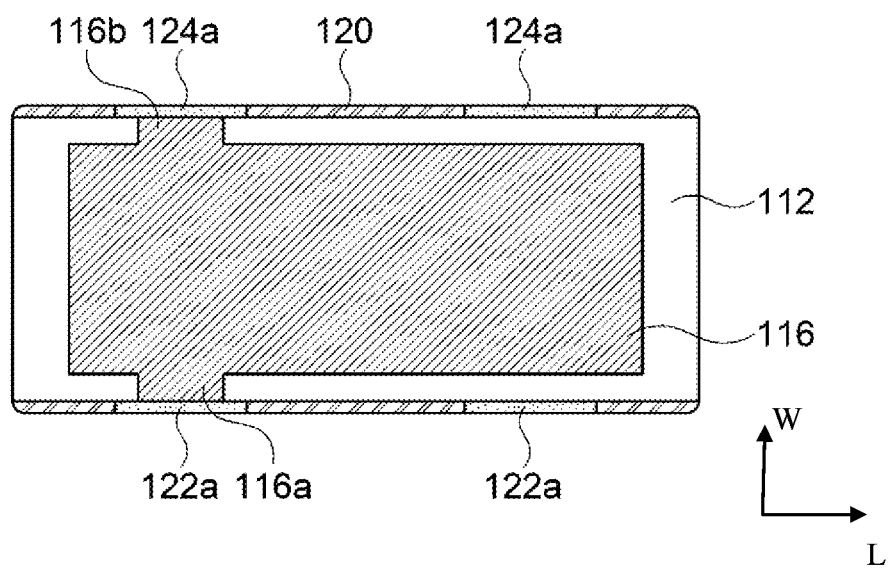
FIGS. 3A through 3D are plan views taken along line II-II' of FIG. 2.
Figure 3B:
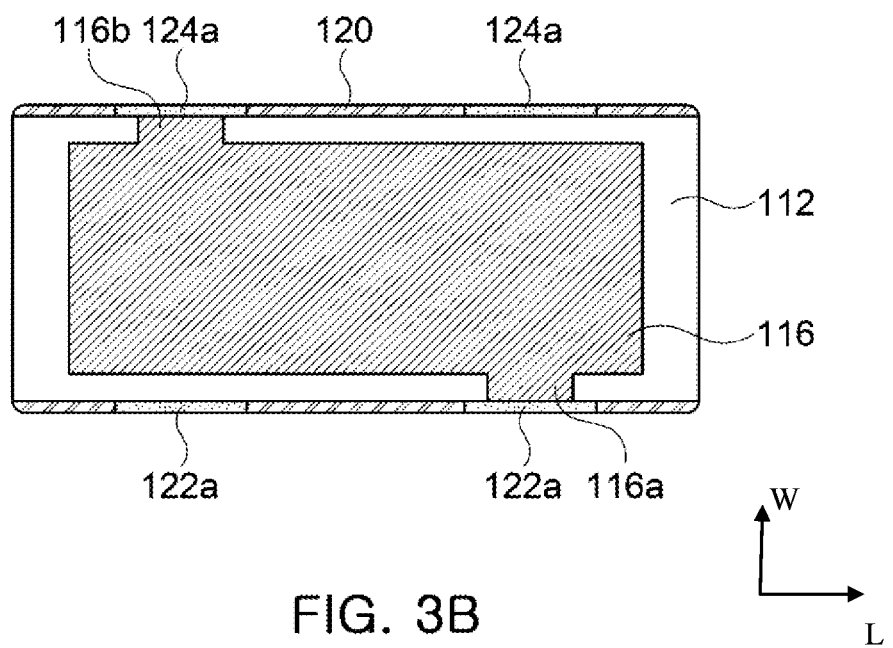
Figure 3C:
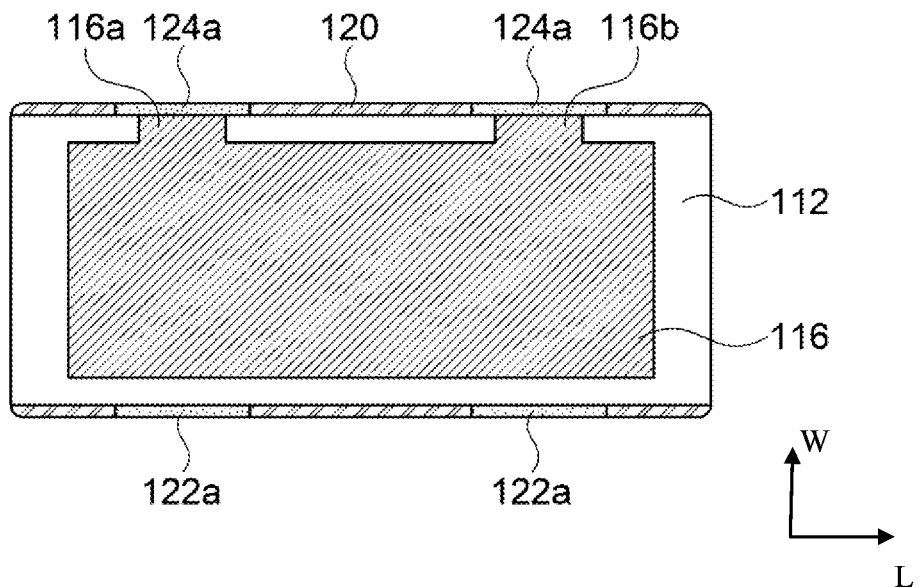
Figure 3D:
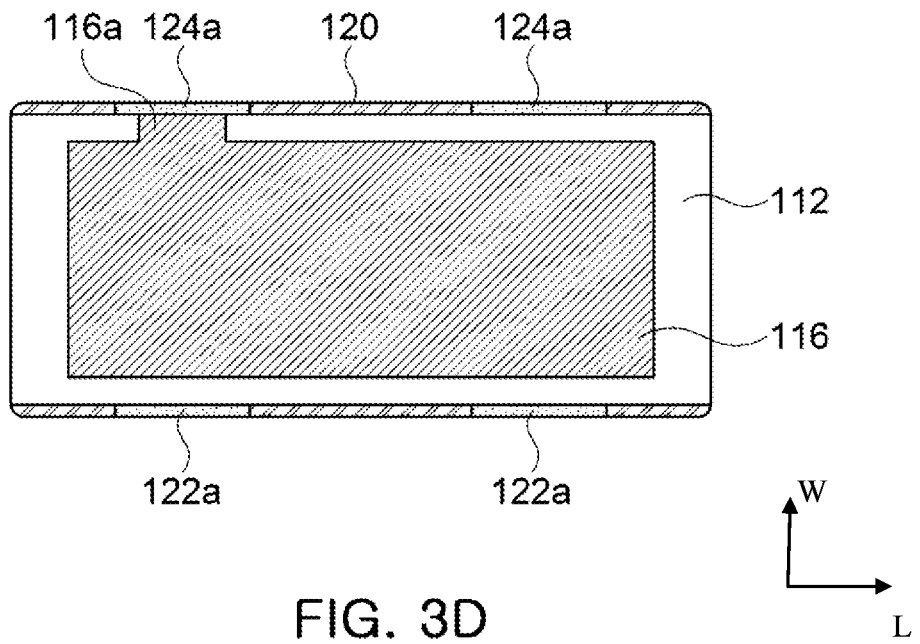
Figure 4:
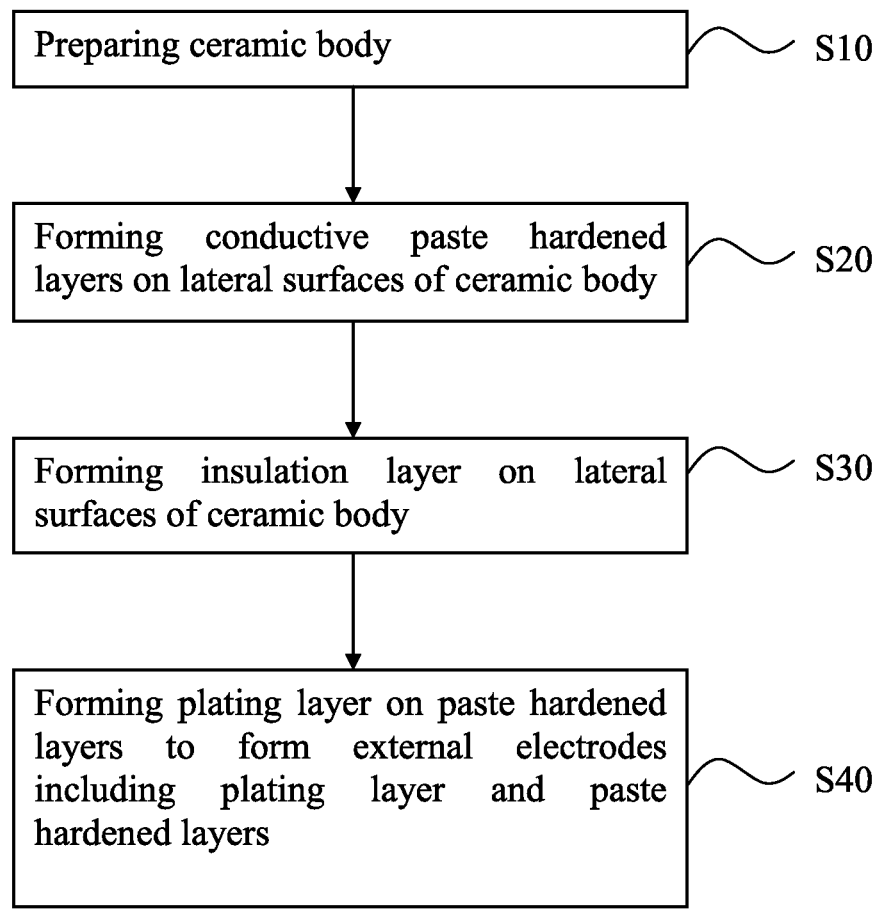
FIG. 4 is a flowchart illustrating a method for manufacturing a multilayer ceramic electronic component according to an exemplary embodiment in the present disclosure.

FIG. 1 is a stereoscopic view schematically illustrating a multilayer ceramic electronic component according to an exemplary embodiment in the present disclosure, FIG. 2 is a cross-sectional view taken along line I=I' of FIG. 1, FIGS. 3A through 3D are plan views taken along line II-II' of FIG. 2, and FIG. 4 is a flowchart illustrating a method for manufacturing a multilayer ceramic electronic component according to an exemplary embodiment in the present disclosure.

Referring to FIGS. 1 through 3D, the multilayer ceramic electronic component may include a ceramic body 110 including dielectric layers 112, a plurality of internal electrodes 114 and 116 stacked in the ceramic body 110 so as to face each other with one of the dielectric layers interposed therebetween, external electrodes 122a and 124a electrically connected to the plurality of internal electrodes 114 and 116, and an insulation layer 120 locally covering a surface of the ceramic body 110 on which the external electrodes 122a and 124a are provided.

As an example of the multilayer ceramic electronic component according to the exemplary embodiment, a multilayer ceramic capacitor will be described, but the example of the multilayer ceramic electronic component is not limited thereto. The multilayer ceramic electronic component according to the exemplary embodiment may perform functions of another electronic component such as an inductor, a thermistor, or the like, by changing structures of the internal electrodes 114 and 116.

In the multilayer ceramic capacitor according to the exemplary embodiment, a "length direction" refers to an "L" direction of FIG. 1, a "width direction" refers to a "W" direction of FIG. 1, and a "thickness direction" refers to a "T" direction of FIG. 1. Here, the "thickness direction" may be the same as a "stacking direction" of the plurality of internal electrodes 114 and 116.

A ceramic body formed by stacking the plurality of dielectric layers 112, having first and second end portions opposing each other and a plurality of lateral surfaces connecting the first and second end portions to each other, and including the plurality of internal electrodes 114 and 116 stacked therein so as to face each other with one of the dielectric layers interposed therebetween and exposed to first and second lateral surfaces of the ceramic body opposing each other among the plurality of lateral surfaces of the ceramic body through respective lead portion 116a or 116b of the internal electrodes 114 and 116 may be prepared.

At least two first external electrodes 122a and at least two second external electrodes 124a may be provided on the first and second lateral surfaces of the ceramic body 110 opposing each other in a width direction among the plurality of lateral surfaces of the ceramic body 110. Therefore, the multilayer ceramic electronic component, according to the exemplary embodiment, may be an array type multilayer ceramic electronic component.

The dielectric layer 112 may contain material capable of obtaining sufficient capacitance. That is, the dielectric layer 112 may contain a ceramic material, but a material of the dielectric layer 112 is not limited thereto. Preferably, the dielectric layers 112, according to the exemplary embodiment, may contain ceramic powder, a ceramic additive, an organic solvent, a plasticizer, a binder, a dispersant, or the like.

The plurality of internal electrodes 114 and 116 may be stacked so as to face each other with one of the dielectric layers 112 interposed therebetween. The plurality of internal electrodes 114 and 116 may be exposed to the first or/and second lateral surfaces of the ceramic body 110 through the respective lead portions 116a and/or 116b. The plurality of internal electrodes 114 and 116 may contain a conductive material. The conductive material may include one material selected from silver (Ag), lead (Pb), platinum (Pt), nickel (Ni), copper (Cu), or a combination thereof. Preferably, the plurality of internal electrodes 114 and 116, according to the exemplary embodiment, may contain nickel. Structures of the plurality of internal electrodes 114 and 116 will be described in detail below.

The first external electrodes 122a may be electrically connected to the plurality of internal electrodes 114 and 116 exposed to the first lateral surface of the ceramic body through the lead portion 116a or 116b. The second external electrodes 124a may be electrically connected to the plurality of internal electrodes 114 and 116 exposed to the second lateral surface of the ceramic body through the lead portions 116a or 116b.

Each of the first and second external electrodes 122a and 124a may contain a conductive paste hardened layer connected to the respective lead portions 116a or 116 of the plurality of internal electrodes 114 and 116 and a plating layer formed on the conductive paste hardened layer. The conductive paste hardened layer may contain silver (Ag). The plating layer may contain nickel (Ni) or tin (Sn).

The insulation layer 120 may be provided on the first and second lateral surfaces of the ceramic body 110 except for the first and second external electrodes 122a and 124a. The insulation layer 120 may cover 99% or more of each of the first and second lateral surfaces of the ceramic body 110 except for the first and second external electrodes 122a and 124a. According to some embodiments, the insulation layer 120 may not cover any surfaces of the ceramic body 110 in a length direction. The insulation layer 120 may contain a non-conductive material. Preferably, the insulation layer 120, according to the exemplary embodiment, may contain an epoxy or a filler containing epoxy. Further, the insulation layer 120 may partially cover the conductive paste hardened layers configuring the first and second external electrodes 122a and 124a.

To manufacture the multilayer ceramic capacitor, the ceramic body 110 is first prepared (S10). Then, at least two conductive paste hardened layers are formed on each of the first and second lateral surfaces of the ceramic body 110 to be connected to the respective lead portions 116a or 116b of the plurality of internal electrodes 114 and 116 (S20). Next, the insulation layer 120 is formed on the first and second lateral surfaces of the ceramic body 110 on which the conductive paste hardened layers are not formed (S30). Next, the plating layer is formed on each of the conductive paste hardened layers (S40). Thus, the first and second external electrodes 122a and 124a are formed.

In the forming of the conductive paste hardened layer, a silver paste may be applied and then hardened. In the forming of the plating layer, nickel or tin plating may be performed on the conductive paste hardened layer. The insulation layer 120 may be formed to further cover portions of the conductive paste hardened layer.

The insulation layer 120 may cover 99% or more of each of the first and second lateral surfaces of the ceramic body 110 except for the first and second external electrodes 122a and 124a. The insulation layer 120 may be formed of the epoxy or filler containing epoxy.

The structures of the plurality of internal electrodes 114 and 116 will be described in detail with reference to FIGS. 3A through 3D. The plurality of internal electrodes 114 and 116 may include at least one lead portion 116a or 116b.

Referring to FIGS. 3A through 3C, the plurality of internal electrodes 114 and 116 may include two lead portions 116a and 116b.

As illustrated in FIGS. 3A and 3B, the plurality of internal electrodes 114 and 116 having two lead portions 116a and 116b may be connected to one of the first external electrodes 122a through a first lead portion 116a, and connected to one of the second external electrodes 124a through a second lead portion 116b.

Although a single internal electrode 116 is illustrated in FIG. 3A, another internal electrode 114 adjacent thereto may be connected to the other of the first external electrodes 122a that is not connected to the single internal electrode 116 through a first lead portion, and may be connected to the other electrode of the second external electrodes 124a though a second lead portion.

Although a single internal electrode 116 is illustrated in FIG. 3B, similarly to FIG. 3A, another internal electrode 114 adjacent thereto may be connected to the other of the first external electrodes 122a that is not connected to the single internal electrode 116 through a first lead portion, and may be connected to the other of the second external electrodes 124a though a second lead portion.

As illustrated in FIG. 3C, the plurality of internal electrodes 116 having two lead portions 116a and 116b may be connected to the second external electrodes 124a through the lead portions 116a and 116b.

Although a single internal electrode 116 is illustrated in FIG. 3C, another internal electrode 114 adjacent thereto may be connected to the first of the external electrodes 122a that are not connected to the single internal electrode 116 through lead portions.

As illustrated in FIG. 3D, the plurality of internal electrodes 114 and 116 having a single lead portion 116a may be connected to one of the second external electrodes 124 through the lead portion 116a.

Although a single internal electrode 116 is illustrated in FIG. 3D, another internal electrode 114 adjacent thereto may be connected to the other of the second external electrodes 124a that is not connected to the single internal electrode 116 or one of the first external electrodes 122a through a lead portion.

The plurality of internal electrodes 114 and 116 may have various connection structures depending on the needs of external circuits electrically connected to the first and second external electrodes 122a and 124a. Among the plurality of internal electrodes 114 and 116, internal electrodes 114 or 116 having the same structure may configure a single internal electrode group.

As set forth above, according to exemplary embodiments, the insulation layer may be provided on the surfaces of the ceramic body on which the external electrodes are provided to cover regions of the surfaces of the ceramic body except for the external electrodes, thereby preventing reliability from being deteriorated due to plating spread while the external electrodes are formed by a plating method. Therefore, the multilayer ceramic electronic component capable of increasing a yield may be provided.

Further, according to exemplary embodiments, the insulation layer may be provided on the surfaces of the ceramic body on which the external electrodes are provided to cover regions of the surfaces of the ceramic body except for the external electrodes, thereby preventing reliability from being deteriorated due to plating spread while the external electrodes are formed by a plating method. Therefore, the method of manufacturing a multilayer ceramic electronic component capable of increasing a yield may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
    a ceramic body comprising a stacked plurality of dielectric layers and having first and second end portions opposing each other and a plurality of lateral surfaces connecting the first and second end portions to each other;
    a plurality of internal electrodes stacked in the ceramic body facing each other with respective dielectric layers interposed between the plurality of internal electrodes and exposed to first and second lateral surfaces of the ceramic body opposing each other among the plurality of lateral surfaces of the ceramic body through respective lead portions of the plurality of internal electrodes;

at least two first external electrodes and at least two second external electrodes on the first and second lateral surfaces of the ceramic body to be connected to the respective lead portions of the plurality of the internal electrodes, respectively; and an insulation layer on the first and second lateral surfaces of the ceramic body except for exterior layers of the first and second external electrodes, wherein the insulation layer is formed of epoxy or filler containing epoxy, each of the first and second external electrodes comprises:
- a conductive paste hardened layer connected to the lead portions; and
- a plating layer, which is the exterior layer thereof, formed on the conductive paste hardened layer, and the insulation layer further covers a portion of the conductive paste hardened layer.

2. The multilayer ceramic electronic component of claim 1, wherein each of the plurality of internal electrodes has two lead portions.

3. The multilayer ceramic electronic component of claim 1, wherein the conductive paste hardened layer contains silver.

4. The multilayer ceramic electronic component of claim 1, wherein the plating layer contains nickel or tin.

5. The multilayer ceramic electronic component of claim 1, wherein the insulation layer covers 99% or more of each of the first and second lateral surfaces of the ceramic body except for the exterior layers of the first and second external electrodes.

6. A method of manufacturing a multilayer ceramic electronic component, the method comprising:

preparing a ceramic body formed by stacking a plurality of dielectric layers, having first and second end portions opposing each other and a plurality of lateral surfaces connecting the first and second end portions to each other, and including a plurality of internal electrodes stacked in the ceramic body to face each other with respective dielectric layers interposed between the plurality of internal electrodes and exposed to first and second lateral surfaces of the ceramic body opposing each other among the plurality of lateral surfaces of the ceramic body through respective lead portions of the plurality of internal electrodes;

forming at least two first external electrodes and at least two second external electrodes on the first and second lateral surfaces of the ceramic body to be connected to the respective lead portions of the plurality of internal electrodes; and forming an insulation layer on the first and second lateral surfaces of the ceramic body except for exterior layers of the first and second external electrodes, wherein the insulation layer is formed of an epoxy or a filler-containing epoxy, the forming of the insulation layer and the forming of the first and second external electrodes comprise:
- forming conductive paste hardened layers on each of the first and second lateral surfaces of the ceramic body to be connected to the respective lead portions of the plurality of internal electrodes;
- after forming the conductive paste hardened layers, forming the insulation layer on the first and second lateral surfaces of the ceramic body on which the conductive paste hardened layers are not formed; and
- forming plating layers on the conductive paste hardened layers, and the insulation layer is formed to further cover portions of the conductive paste hardened layers.

7. The method of claim 6, wherein each of the plurality of internal electrodes has two lead portions.

8. The method of claim 6,
wherein the plating layers are the exterior layers of the first and second external electrodes.

9. The method of claim 6, wherein in the forming of the conductive paste hardened layers, a silver paste is applied and then hardened.

10. The method of claim 6, wherein in the forming of the plating layer, nickel or tin plating is performed on the conductive paste hardened layer.

11. The method of claim 6, wherein the insulation layer is formed prior to the plating layer.

12. The method of claim 6, wherein the insulation layer covers 99% or more of each of the first and second lateral surfaces of the ceramic body except for the first and second external electrodes.

13. The method of claim 6, wherein an exterior surface of the insulation layer and exterior surfaces of the first and second external electrodes are flush with each other.

14. The multilayer ceramic electronic component of claim 1, wherein an exterior surface of the insulation layer and exterior surfaces of the first and second external electrodes are flush with each other.

* * * * *